United States Patent [19]

Cavivenc et al.

[11] Patent Number: 5,618,879

[45] Date of Patent: Apr. 8, 1997

[54] AQUEOUS DISPERSIONS OF FUNCTIONAL GRAFT POLYORGANOSILOXANES AND CURABLE SILICONE COMPOSITIONS COMPRISED THEREOF

[75] Inventors: Edith Cavivenc, Lyons; Joel Richard, Chantilly, both of France

[73] Assignee: Rhone-Poulenc Chimie, Courbevoie, France

[21] Appl. No.: 621,320

[22] Filed: Mar. 25, 1996

Related U.S. Application Data

[63] Continuation of Ser. No. 280,344, Jul. 25, 1994, abandoned.

[30] Foreign Application Priority Data

Jul. 23, 1993 [FR] France .................................. 93 09095

[51] Int. Cl.$^6$ ....................................................... C08L 83/00
[52] U.S. Cl. ............................. 524/588; 528/25; 528/32; 528/33
[58] Field of Search ............................ 528/32, 25, 33; 524/588

[56] References Cited

U.S. PATENT DOCUMENTS

| 3,575,910 | 4/1971 | Thomas | 528/32 |
| 5,283,296 | 2/1994 | Canivenc et al. | 525/446 |

FOREIGN PATENT DOCUMENTS

| 0541395 | 5/1993 | European Pat. Off. . |
| 1149935 | 4/1969 | United Kingdom . |
| 9010665 | 9/1990 | WIPO . |

*Primary Examiner*—Mark D. Sweet

*Attorney, Agent, or Firm*—Burns, Doane, Swecker & Mathis, L.L.P.

[57] ABSTRACT

Stable reactive aqueous dispersions of functional graft polyorganosiloxanes, well suited for formulation into curable silicone compositions useful in the production of release- and other coatings and paints, comprise the polymerizate of at least one ethylenically unsaturated monomer with a functional polyorganosiloxane which comprises identical or different recurring structural units of formula (I):

$$R_a Y_b X_c SiO_{(4-a-b-c)/2} \qquad (I)$$

in which the radicals R, which may be identical or different, are each a $C_1$–$C_{18}$ alkyl radical, a $C_2$–$C_{20}$ alkenyl radical, or a $C_6$–$C_{12}$ aryl or aralkyl radical, or halogen-substituted such radical; the radicals X, which may be identical or different, are each a hydrogen atom or a reactive functional group bonded to a silicon atom via an Si-C or Si-O-C linkage; the radicals Y, which may be identical or different, are each an ethylenically unsaturated hydrocarbon radical optionally comprising one or more of the heteroelements O and/or N, and bonded to a silicon atom of the structural unit of formula (I) via an Si-C linkage and reactive with said at least one ethylenically unsaturated monomer; a, b and c are each equal to 0, 1, 2 or 3; and a+b+c=0, 1, 2 or 3; with the proviso that the number of $SiO_{4/2}$ units is less than 30 mol % and the number of structural units of formula (I) in which the silicon atom is substituted by a functional group X and/or a radical Y is such that the polyorganosiloxane comprises (i) at least 5 milliequivalents, preferably from 10 to 500 milliequivalents, of X functional groups per 100 grams of polyorganosiloxane of formula (I) and (ii) at least 5 milliequivalents, preferably from 10 to 500 milliequivalents, of Y radicals per 100 grams of polyorganosiloxane of formula (I).

24 Claims, No Drawings

AQUEOUS DISPERSIONS OF FUNCTIONAL GRAFT POLYORGANOSILOXANES AND CURABLE SILICONE COMPOSITIONS COMPRISED THEREOF

This application is a continuation of application Ser. No. 08/280,344, filed Jul. 25, 1994, now abandoned.

BACKGROUND OF THE INVENTION

1. Field of the Invention

The present invention relates to stable reactive aqueous dispersions of functionalized polyorganosiloxanes grafted with recurring polymer structural units emanating from ethylenically unsaturated monomers polymerizable via radical route, to a process for the preparation thereof and to the formulation of same into curable silicone compositions.

SUMMARY OF THE INVENTION

Briefly, the present invention features stable reactive aqueous dispersions of functional graft polyorganosiloxanes, said functional graft polyorganosiloxanes comprising grafted copolymer structural units prepared from at least one ethylenically unsaturated monomer polymerizable via radical polymerization and a functionalized polyorganosiloxane which comprises identical or different recurring structural units of formula (I):

$$R_a Y_b X_c SiO_{(4-a-b-c)/2} \quad (I)$$

in which the radicals R, which may be identical or different, are each a $C_1$–$C_{18}$ alkyl radical, a $C_2$–$C_{20}$ alkenyl radical, or a $C_6$–$C_{12}$ aryl or aralkyl radical, or an optionally halogen-substituted (especially fluorine) such radical; the radicals X, which may be identical or different, are each a hydrogen atom or a reactive functional group bonded to a silicon atom via an Si-C or Si-O-C linkage; the radicals Y, which may be identical or different, are each an ethylenically unsaturated hydrocarbon radical optionally comprising one or more of the heteroelements O and/or N, and bonded to a silicon atom of the structural unit of formula (I) via an Si-C linkage and reactive with said ethylenically unsaturated monomer(s) by radical mechanism; a, b and c are each equal to 0, 1, 2 or 3; and a+b+c=0, 1, 2 or 3; with the proviso that the number of $SiO_{4/2}$ units is less than 30 mol % and the number of structural units of formula (I) in which the silicon atom is substituted by a functional group X and/or a radical Y is such that said polyorganosiloxanes comprise (i) at least 5 milliequivalents, preferably from 10 to 500 milliequivalents, of X functional groups per 100 grams of polyorganosiloxane of formula (I) and (ii) at least 5 milliequivalents, preferably from 10 to 500 milliequivalents, of Y radicals per 100 grams of polyorganosiloxane of formula (I).

DETAILED DESCRIPTION OF BEST MODE AND PREFERRED EMBODIMENTS OF THE INVENTION

More particularly according to the present invention, exemplary ethylenically unsaturated monomers from which the subject functional graft polyorganosiloxanes are prepared, include:

(1) monoethylenically unsaturated esters of saturated carboxylic acids (vinyl acetate, propionate, butyrate, stearate, benzoate, etc.);

(2) saturated esters and amides of monoethylenically unsaturated carboxylic acids ($C_1$–$C_{20}$ alkyl, such as methyl, butyl, heptyl, propyl, heptadecanyl, etc., acrylates and methacrylates, acrylamide, methacrylamide, etc.);

(3) monoethylenically unsaturated nitriles (acrylonitrile, methacrylonitrile, etc.);

(4) monoethylenically unsaturated carboxylic acids (acrylic, methacrylic, itaconic, maleic, etc., acid);

(5) hydroxyalkyl or aminoalkyl esters of monoethylenically unsaturated carboxylic acids (hydroxyethyl, hydroxypropyl, etc., acrylate, 2-aminoethyl methacrylate, etc.);

(6) vinylaromatic monomers (styrene, vinyltoluene, etc.);

(7) dicyclopentadienyl acrylate or methacrylate;

(8) and the like.

Exemplary of the radicals R in formula (I) are methyl, ethyl, octyl, trifluoropropyl, vinyl, hexenyl, phenyl, etc., radicals; preferably, at least 80 mol % of said radicals R are methyl radicals.

By "reactive functional group" is intended any functional group chemically reactive by addition, polyaddition, condensation, polycondensation, dehydropolycondensation, these optionally being carried out under the action of heat, radiation, electron beam, etc., and/or catalytically.

Thus, exemplary reactive functional groups X include the hydro functional group and hydrocarbon groups having from 1 to 20 carbon atoms of the following types:

(1) alkenyl or cycloalkenyl radicals, such as vinyl, 3-butenyl, 5-hexenyl, 9-decenyl, 10-undecenyl, 5,9-decadienyl, 6,11-dodecadienyl, cyclopentadienyl, dicyclopentadienyl, etc.;

(2) hydroxyfunctional groups, such as 3-hydroxypropyl, 3-(2-hydroxyethoxy)propyl, etc.;

(3) epoxyfunctional groups, such as 3-glycidoxypropyl, 4-ethanediyl(1,2-epoxycyclohexyl), etc.;

(4) alkoxyfunctional groups, such as methoxy, ethoxy, butoxy, octyloxy, etc.;

(5) aryloxyfunctional groups, such as phenyloxy, etc.;

(6) acyloxyfunctional groups, such as acetoxy, etc.;

(7) alkenylcarbonyloxyfunctional groups, such as acryloyloxy, methacryloyloxy, etc.

And exemplary radicals Y are those of the formula -y-Y', in which y is a polyvalent hydrocarbon radical optionally comprising one or more of the heteroelements O and/or N, such as $C_1$–$C_{18}$ linear or branched alkylene radicals optionally extended by divalent groups of the following types:

(1) ethyleneamine or polyethyleneamine;

(2) $C_1$–$C_3$ oxyalkylene or polyoxyalkylene, optionally substituted by a hydroxyl group;

(3) hydroxycyclohexylene, etc.; and Y' is an ethylenically unsaturated radical, for example alkenylcarbonyloxy radicals, such as acryloyloxy, methacryloyloxy, etc.

Specific examples of the radicals y include: —$CH_2$—, —($CH_2$)$_2$, —($CH_2$)$_3$, —$CH_2$—$CH(CH_3)$—$CH_2$—, —($CH_2$)$_3$—NH—$CH_2$—$CH_2$—, —($CH_2$)$_3$—$OCH_2$—, —($CH_2$)$_3$—($OCH_2$—$CH_2$)$_{29}$—, —($CH_2$)$_3$—[O—$CH_2$—$CH(CH_3)$]$_7$, —($CH_2$)$_3OCH_2CH(OH)CH_2$—, —($CH_2$)$_2$—$C_6H_9(OH)$—

The subject polyorganosiloxanes comprising the recurring structural units of formula (I) may be linear polymers optionally containing up to 50% by weight of branching (structural units other than "D" units), cyclic polymers, or three-dimensional polymers (resins).

The stable reactive dispersions of this invention typically have a solids content on the order of 5% to 60%, preferably on the order of 25% to 50% by weight.

The aqueous dispersions according to the present invention are conveniently prepared by radical polymerization in aqueous emulsion, or in microsuspension, of at least one ethylenically unsaturated monomer in the presence of the functionalized polyorganosiloxane comprising identical or different recurring structural units of formula (I).

The respective amounts of ethylenically unsaturated monomer(s) and of functionalized polyorganosiloxane advantageously correspond to a monomer(s)/polyorganosiloxane weight ratio on the order of 98–50/2–50, preferably on the order of 95–75/5–25.

The polymerization is carried out in the presence of emulsifying agents and of an initiator for radical polymerization.

Exemplary of the emulsifying agents, whether used alone or in admixture, are the traditional anionic agents such as the alkali metal salts of fatty acids, alkyl sulfates, alkylsulfonates, alkylarylsulfonates, sulfosuccinates, alkyl phosphates, abietic acid salts, whether or not hydrogenated, nonionic agents such as polyethoxylated fatty alcohols, polyethoxylated and optionally sulfated alkylphenols, polyethoxylated fatty acids, etc.

The emulsifying agents are advantageously employed in a proportion of 0.1% to 3% by weight relative to the total weight of ethylenically unsaturated monomer(s) and functionalized polyorganosiloxane.

The initiators are advantageously of the water-soluble or water-dispersible type, such as hydroperoxides, for example aqueous hydrogen peroxide, cumene hydroperoxide, tert-butyl hydroperoxide, diisopropylbenzene hydroperoxide, persulfates such as sodium persulfate, potassium persulfate, ammonium persulfate, etc.

The initiators are advantageously employed in a proportion of 0.01% to 4%, preferably from 0.05% to 2% by weight relative to the total weight of ethylenically unsaturated monomer(s) and functionalized polyorganosiloxane.

These initiators are optionally used in combination with a reducing agent, such as bisulfites or sodium formaldehydesulfoxylate, polyethyleneamines, sugars such as dextrose, sucrose, and the metal salts of ascorbic acid. The amounts of reducing agent are advantageously up to 3% by weight relative to the weight of the mixture of monomer(s)+functionalized polyorganosiloxane.

Chain-limiting agents may optionally be present in proportions ranging from 0% to 3% by weight relative to the mixture of monomer(s)+functionalized polyoganosiloxane. They are generally selected from among mercaptans such as n-dodecyl mercaptan, tert-dodecyl mercaptan, cyclohexene, halogenated hydrocarbons such as chloroform, bromoform, carbon tetrachloride and carbon tetrabromide, α-methylstyrene dimers, etc.

The polymerization may be carried out according to any one of a number of different techniques.

A first such technique comprises homogenizing a mixture of ethylenically unsaturated monomer(s)/-functionalized polyorganosiloxane in a water/emulsifier mixture, and polymerizing the resulting emulsion in the presence of a water-soluble or water-dispersible initiator at a temperature at least equal to that of decomposition of said initiator.

A second technique comprises introducing a mixture of ethylenically unsaturated monomer(s)/water-soluble or water-dispersible initiator into an aqueous emulsion of functionalized polyorganosiloxane, and polymerizing the resulting formulation at a temperature at least equal to that of decomposition of the initiator.

Another technique comprises preemulsifying a mixture of ethylenically unsaturated monomer(s)/functionalized polyorganosiloxane/-organosoluble initiator in a water/emulsifier mixture, and polymerizing the resulting formulation at a temperature at least equal to that of decomposition of the said initiator.

Exemplary organosoluble initiators include organic peroxides such as lauroyl, benzoyl, tert-butyl, etc., peroxide and azonitriles such as azobisisobutyronitrile, etc.

The polymerization is advantageously carried out at a temperature on the order of 60° to 85° C.

The stable reactive aqueous dispersions of functional graft polyorganosiloxanes according to the present invention may be used for formulating silicone compositions which can be cured under the action of heat, radiation, electron beams, etc., and/or catalytically.

Thus, the stable reactive aqueous dispersions based on functional graft polyorganosiloxanes prepared from functionalized polyorganosiloxanes comprising recurring structural units of formula (I) in which X is a hydrogen atom may be formulated with polyorganosiloxanes substituted by hydroxyl functional groups for the preparation of compositions which can be cured in the presence of catalysts based on metals or metal compounds of the tin, platinum, rhodium, etc., type, or with polyorganosiloxanes substituted by alkenyl functional groups for the preparation of compositions which can be cured in the presence of polyaddition catalysts based on metals or metal compounds of the platinum, rhodium, etc., type.

The stable reactive aqueous dispersions based on functional graft polyorganosiloxanes prepared from functionalized polyorganosiloxanes comprising recurring structural units of formula (I) in which X is an alkenyl radical may be formulated with polyorganosiloxanes substituted by hydrogen atoms for the preparation of compositions which can be cured in the presence of polyaddition catalysts based on metals or metal compounds of the platinum, rhodium, etc., type.

The stable reactive aqueous dispersions based on functional graft polyorganosiloxanes prepared from functionalized polyorganosiloxanes comprising recurring structural units of formula (I) in which X is a hydroxyl radical may be formulated with silanes substituted by hydrolyzable groups, such as acyloxy, alkoxy, amino, amido, alkenyloxy, aminoxy or ketiminoxy groups, for the preparation of compositions which can be cured by polycondensation hydrolysis in the presence of catalysts based on metals or metal compounds of the tin, etc., type.

The stable reactive aqueous dispersions based on functional graft polyorganosiloxanes prepared from functionalized polyorganosiloxanes comprising recurring structural units of formula (I) in which X is an epoxy radical can be crosslinked cationically in the presence of a cationic polymerization catalyst of the iodonium hexafluoroantimonate type, under UV radiation.

The stable reactive aqueous dispersions based on functional graft polyorganosiloxanes prepared from functionalized polyorganosiloxanes comprising recurring structural units of formula (I) in which X is an acryloyloxy radical can be crosslinked under an electron beam.

The aforesaid stable reactive dispersions based on functional graft polyorganosiloxanes are especially well suited for applications in the fields of release papers, water-repellent paints and semithick coatings, and the like.

Release coatings for paper substrates are conveniently produced from formulations including:

(a) from 10% to 80% by weight of said dispersions, and (b) from 90% to 20% by weight of an aqueous emulsion of a polyorganosiloxane which is reactive with the X functional groups of the grafted functional polyorganosiloxane, to form, by polyaddition or by hydrolysis and/or polycondensation, a coating crosslinked via thermal route and/or under UV radiation in the presence of a catalyst, or under an electron beam.

In order to further illustrate the present invention and the advantages thereof, the following specific examples are given, it being understood that same are intended only as illustrative and in nowise limitative.

EXAMPLE 1

An unsaturated organopolysiloxane oil (H1) having the average formula:

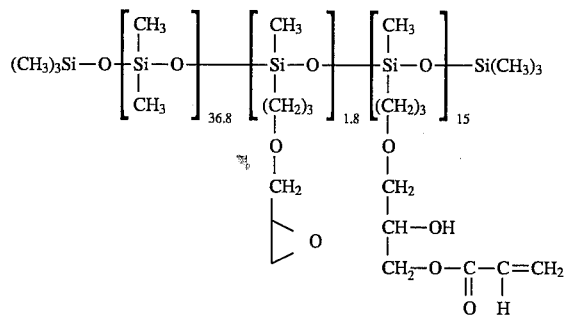

was prepared from the following reactants:

(i) 100 g of a polyorganosiloxane oil containing (titration) 290 meq./100 g of glycidyl ether functional groups, of the formula:

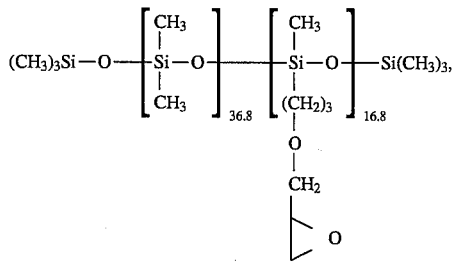

(ii) 21 g of acrylic acid, (iii) 0.03 g of hydroquinone (thermal polymerization inhibitor), (iv) 0.2 g of 1,4-diazabicyclo[2.2.2] octane, (v) 50 g of toluene.

The reaction was carried out in a reactor under nitrogen, the temperature of the reaction mixture being raised and maintained at 100° C. until a degree of conversion of the oxirane functional group of approximately 90% was observed by titration.

The solvents and the unreacted acrylic acid were removed by distillation at reduced pressure (266 Pa).

Preemulsion

The following were mixed in a 1—1 beaker:

(a) 141 g of methyl methacrylate, (b) 135 g of methyl acrylate, and (c) 9 g of acrylic acid.

15 g of the oil (H1) prepared above were added thereto with stirring.

The mixture was maintained under stirring until completely dissolved.

180 g of deionized water and 3.9 g of an aqueous solution of sodium dodecylbenzenesulfonate (Na DBS) at a concentration of 38.5% by weight were mixed in a beaker. The mixture of acrylic monomers/-diorganopolysiloxane was introduced into this solution with stirring. The mixture obtained was emulsified using a homogenizer of the Ultra-Turrax® type (marketed by Prolabo) for 5 minutes at 20,000 revolutions/minute. A preemulsion of the monomers and of the functionalized silicone oil was thus obtained.

Polymerization 198.5 g of water were introduced into a one-liter reactor and heated to 82° C. with stirring.

The following were then added thereto:

(1) 20 g of the preemulsion prepared above, (2) 0.90 g of ammonium persulfate.

After a delay of 15 minutes, initiation of the reaction occurred and the remainder of the preemulsion, namely, 463.90 g, was then added over a 4-hour period. The mixture was maintained heated at 82° C. for 30 minutes. It was then cooled to 60° C. and 0.42 g of tert-butyl hydroperoxide and 0.18 g of $Na_2S_2O_5$ were added. The temperature was maintained at 60° C. for 30 minutes and the mixture was cooled to ambient temperature. It was neutralized with an aqueous ammonia solution diluted to 20%. A latex having a solids content of 40% was obtained, which exhibited very good storage stability.

EXAMPLE 2

An unsaturated organopolysiloxane oil (H2) was prepared, having the average formula:

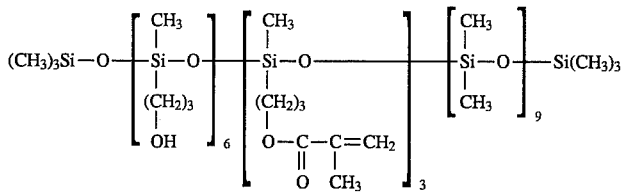

from the following reactants:

(i) 40 g of a polyorganosiloxane oil containing (titration) 468 meq./100 g of gamma-hydroxypropyl functional groups, of the formula:

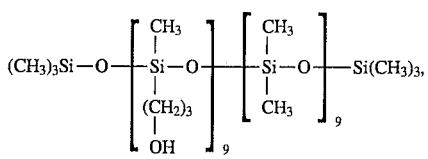

(ii) 65.5 g of methyl methacrylate,
(iii) 1.13 g of n-butyltin oxide,
(iv) 0.26 g of hydroquinone.

The reaction was carried out for 1 hour at 100° C. and then, at the end of reaction, the excess methyl methacrylate was removed by distillation for 1 hour at 0.4 kPa.

Preemulsion

The following were introduced into a one-liter reactor with vigorous stirring (Ultra-Turrax® homogenizer):

(a) 141 g of methyl methacrylate,
(b) 120 g of butyl acrylate,
(c) 380 g of deionized water,
(d) 9 g of acrylic acid,
(e) 30 g of the silicone oil (H2) prepared above,
(f) 3.5 g of lauroyl peroxide,
(g) 3.9 g of an aqueous solution of Na DBS at a concentration of 38.5% by weight.

Polymerization

The preemulsion was heated to 70° C. with stirring and this temperature was maintained throughout the reaction period, namely, 5 hours. The mixture was neutralized by adding an aqueous solution of aqueous ammonia at a concentration of 20%.

A latex having a solids content of 40% was obtained.

EXAMPLE 3

An unsaturated organopolysiloxane oil (H3) having the following average formula was prepared, containing (titration) 220 meq./100 g of acetoacetate functional groups:

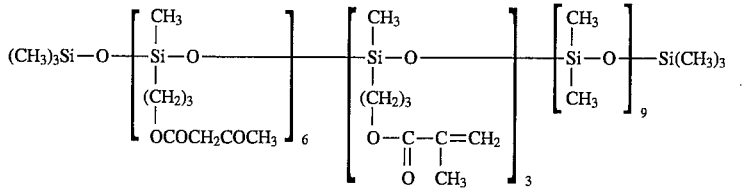

from:
(i) 100 g of the above silicone oil (H2),
(ii) 1 ml of triethylamine,
(iii) 150 ml of toluene,
(iv) 27.7 g of diketene.

The reaction was carried out at a temperature of 50° C. for 1 hour after the end of the addition of diketene.

The excess diketene was evaporated at reduced pressure (0.7 kPa) at 50°–60° C.

Preemulsion

The following were introduced into a one-liter reactor with vigorous stirring (Ultra-Turrax® homogenizer):

(a) 141 g of methyl methacrylate,
(b) 105 g of butyl acrylate,
(c) 9 g of acrylic acid,
(d) 380 g of deionized water,
(e) 45 g of the silicone oil (H3),
(f) 7.8 g of an aqueous solution of Na DBS at a concentration of 38.5% by weight,
(g) 2.5 g of azobisisobutyronitrile (AIBN).

Polymerization

The preemulsion was heated to 65° C. with stirring and this temperature was maintained for 6 hours. The mixture was neutralized by adding an aqueous solution of sodium carbonate.

A latex having a solids content of 40% was obtained.

EXAMPLE 4

An aqueous binder dispersion for semithick coating paint (having a pigment volume concentration less than or equal to 30%) was prepared by mixing 65 parts of a Rhodopas® DS 910 styrene/carboxylated butyl acrylate copolymer latex (marketed by Rhône-Poulenc) with 35 parts of the reactive dispersion prepared in Example 1.

A polymer film was produced from this mixture by dehydration for 2 hours at 60° C. in an elastomer mold. The film crosslinked by reaction of the epoxy functional groups of the silicone and of the COOH functional groups of the latex. The resistance to liquid water was measured by immersing the film for 24 hours at 23° C.

A control film was prepared from the same Rhodopas® DS 910 latex by itself under the same conditions and was subjected to the same liquid water resistance test. The film containing the reactive dispersion of grafted silicones exhibited a quantity of absorbed water which was 40% lower than that measured for the film produced from the latex alone.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A stable reactive aqueous dispersion of a functional graft polyorganosiloxane, said functional graft polyorganosiloxane comprising the polymerizate of at least one ethylenically unsaturated monomer with a functional polyorganosiloxane which comprises identical or different recurring structural units of formula (I):

$$R_a Y_b X_c SiO_{(4-a-b-c)/2} \qquad (I)$$

in which the radicals R, which may be identical or different, are each a $C_1$–$C_{18}$ alkyl radical, a $C_2$–$C_{20}$ alkenyl radical, or a $C_6$–$C_{12}$ aryl or aralkyl radical, or halogen-substituted such radical; the radicals X, which may be identical or different, are each a hydrogen atom or a reactive functional group bonded to a silicon atom via an Si-C or Si-O-C linkage; the radicals Y, which may be identical or different, are each an ethylenically unsaturated hydrocarbon radical optionally comprising one or more of the heteroelements O and/or N, and bonded to a silicon atom of the structural unit of formula (I) via an Si-C linkage and reactive with said at least one ethylenically unsaturated monomer; a, b and c are each equal to 0, 1, 2 or 3; and a+b+c=0, 1, 2 or 3; with the proviso that the number of $SiO_{4/2}$ units is less than 30 mol % and the number of structural units of formula (I) in which the silicon atom is substituted by a functional group X and/or a radical Y is such that the polyorganosiloxane comprises (i) at least 5 milliequivalents of X functional groups per 100 grams of polyorganosiloxane of formula (I) and (ii) at least 5 milliequivalents of Y radicals per 100 grams of polyorganosiloxane of formula (I); wherein said stable reactive aqueous dispersion will form, with a reactant, a curable silicone composition.

2. The stable reactive aqueous dispersion as defined by claim 1, said at least one ethylenically unsaturated monomer comprising a monoethylenically unsaturated ester of a saturated carboxylic acid, a saturated ester or amide of a monoethylenically unsaturated carboxylic acid, a monoethylenically unsaturated nitrile, a monoethylenically unsaturated carboxylic acid, a hydroxyalkyl or aminoalkyl ester of a monoethylenically unsaturated carboxylic acid, a vinylaromatic compound, or dicyclopentadienyl acrylate or methacrylate.

3. The stable reactive aqueous dispersion as defined by claim 1, said functional groups X being chemically reactive via addition, polyaddition, condensation, polycondensation, or dehydropolycondensation.

4. The stable reactive aqueous dispersion as defined by claim 3, said reactive functional groups X comprising a hydrofunctional group, alkenyl or cycloalkenyl radical, hydroxyfunctional group, epoxyfunctional group, alkoxyfunctional group, aryloxyfunctional group, acyloxyfunctional group, or alkenylcarbonyloxyfunctional group.

5. The stable reactive aqueous dispersion as defined by claim 1, said radicals Y having the formula -y-Y', in which y is a $C_1$–$C_{18}$ linear or branched alkylene radical optionally extended via a divalent ethylenediamine, polyethyleneamine, oxyalkylene or polyoxyalkylene radical, optionally substituted by a hydroxyl or hydroxycyclohexylene radical, and Y' is an alkenylcarbonyloxy radical.

6. The stable reactive aqueous dispersion as defined by claim 1, at least 80 mol % of said radicals R being methyl radicals.

7. The stable reactive aqueous dispersion as defined by claim 5, said radicals y comprising a —$CH_2$—, —$(CH_2)_2$—, —$(CH_2)_3$—, —$CH_2$—$CH(CH_3)$—$CH_2$—, —$(CH_2)_3$—NH—$CH_2$—$CH_2$—, —$(CH_2)_3$—$OCH_2$—, —$(CH_2)_3$—$(OCH_2$—$CH_2)_{29}$—, —$(CH_2)_3$—[O—$CH_2$—$CH(CH_3)$]—, —$(CH_2)_3$—$OCH_2CH(OH)CH_2$—, or —$(CH_2)_2$—$C_6H_9(OH)$— radical.

8. The stable reactive aqueous dispersion as defined by claim 1, comprising a linear polymerizate.

9. The stable reactive aqueous dispersion as defined by claim 1, comprising an up to 50% by weight branched polymerizate.

10. The stable reactive aqueous dispersion as defined by claim 1, comprising a cyclic polymerizate.

11. The stable reactive aqueous dispersion as defined by claim 1, comprising a three-dimensional polymerizate.

12. The stable reactive aqueous dispersion as defined by claim 1, comprising (i) from 10 to 500 milliequivalents of X functional groups and (ii) from 10 to 500 milliequivalents of Y radicals per 100 grams thereof.

13. The stable reactive aqueous dispersion as defined by claim 1, having a solids content ranging from about 5% to 60% by weight.

14. The stable reactive aqueous dispersion as defined by claim 13, having a solids content ranging from about 25% to 50% by weight.

15. A curable silicone composition comprising the stable reactive aqueous dispersion as defined by claim 1.

16. The silicone composition as defined by claim 15, in crosslinked state.

17. The curable silicone composition as defined by claim 15, comprising from 10% to 80% by weight of said stable reactive aqueous dispersion and from 90% to 20% by weight of an aqueous emulsion of a polyorganosiloxane reactive with the X functional groups of said functional graft polyorganosiloxane.

18. A release coating comprising the silicone composition as defined by claim 16.

19. A paint comprising the silicone composition as defined by claim 16.

20. A process for the preparation of a stable reactive aqueous dispersion as defined by claim 1, comprising radically polymerizing said at least one ethylenically unsaturated monomer, in aqueous emulsion or in microsuspension, in the presence of said functional graft polyorganosiloxane (I).

21. The process as defined by claim 20, carried out in the presence of an emulsifying agent and a radical polymerization initiator.

22. The process as defined by claim 21, comprising homogenizing a mixture of said at least one ethylenically unsaturated monomer and said functional graft polyorganosiloxane in a water/emulsifier admixture, and then polymerizing same in the presence of a water-soluble or water-dispersible polymerization initiator, at a temperature a least equal to the decomposition temperature of said initiator.

23. The process as defined by claim 21, comprising introducing a mixture of said at least one ethylenically unsaturated monomer and said polymerization initiator into an aqueous emulsion of said functional graft polyorganosiloxane, and then polymerizing same at a temperature at least equal to the decomposition temperature of the initiator.

24. The process as defined by claim 21, comprising preemulsifying a mixture of said at least one ethylenically unsaturated monomer, said functional graft polyorganosiloxane and said polymerization initiator in a water/emulsifier admixture, and then polymerizing same at a temperature at least equal to the decomposition temperature of the initiator.

* * * * *